Dec. 13, 1960 G. L. HOBROUGH 2,964,639
IMAGE INSPECTING SYSTEM AND METHOD
Filed Aug. 17, 1956 6 Sheets-Sheet 1
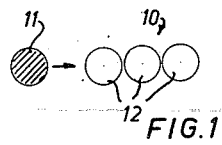
FIG. 1
FIG. 2
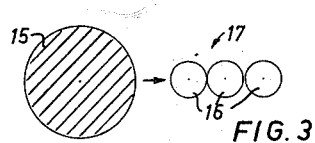
FIG. 3
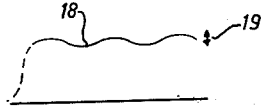
FIG. 4
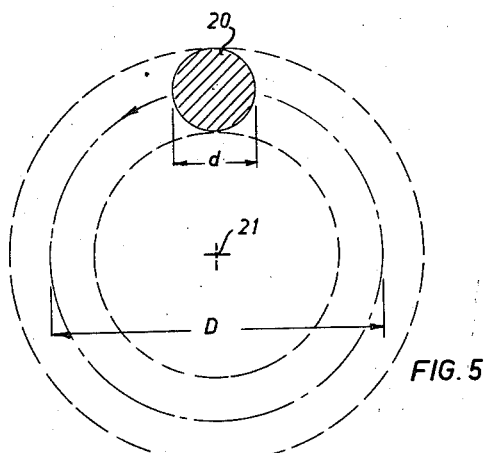
FIG. 5
FIG. 6
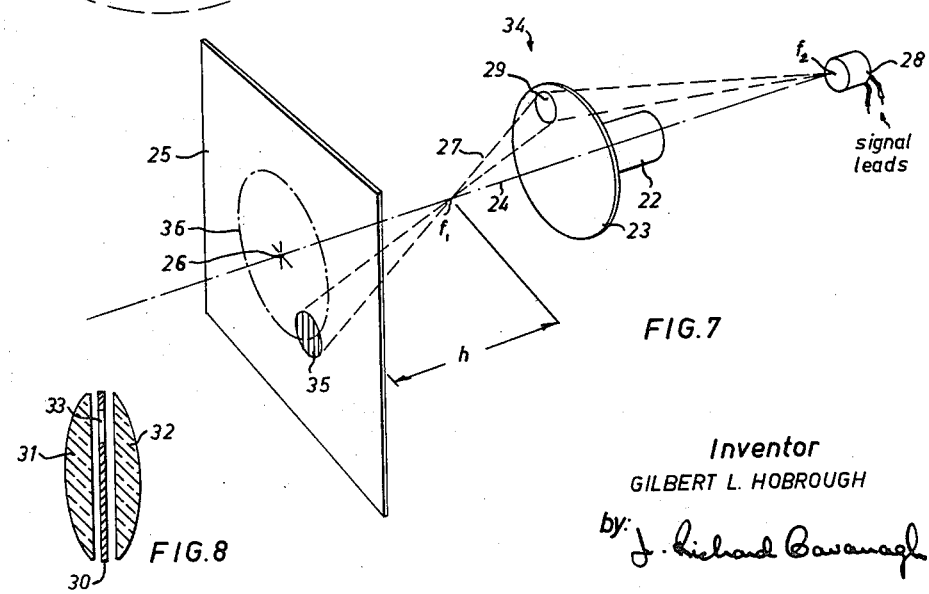
FIG. 7
FIG. 8
Inventor
GILBERT L. HOBROUGH
by: J. Richard Cavanagh Inventor
GILBERT L. HOBROUGH Dec. 13, 1960  G. L. HOBROUGH  2,964,639
IMAGE INSPECTING SYSTEM AND METHOD
Filed Aug. 17, 1956  6 Sheets-Sheet 3

IDENTICAL SCANNING PATTERNS
CORRELATION  NO CORRELATION

SCAN 1

SCAN 2

MULTIPLIED SIGNALS

FILTERED OUTPUT  D.C. SIGNAL  ZERO D.C. SIGNAL

FIG. 14

UNIFORM CORRELATION  X ERROR  Y ERROR

SCAN 1  SCAN 1  SCAN 1

CONSTANT DIFFERENCE SCAN 2  CONSTANT DIFFERENCE SCAN 2  CONSTANT DIFFERENCE SCAN 2

MULTIPLIED SIGNALS  MULTIPLIED SIGNALS  MULTIPLIED SIGNALS

D.C. SIGNAL
B.P. FILTER OUTPUT $\bar{y}\ \overline{xy}\ \overline{xy}\ \overline{xy}\ \overline{xy}\ \overline{xy}\ \overline{xy}\ \overline{xy}\ \overline{xy}\ \overline{xy}\ \overline{x}$
B.P. FILTER OUTPUT
X COMPONENT $\bar{y}\ \overline{xy}\ \overline{xy}\ \overline{xy}\ \overline{xy}\ \overline{xy}\ \overline{xy}\ \overline{xy}\ \overline{xy}\ \overline{xy}\ \overline{x}$
B.P. FILTER OUTPUT
Y COMPONENT bias
L.P. FILTER OUTPUT
H SIGNAL
FIG. 26 bias
L.P. FILTER OUTPUT
H SIGNAL
FIG. 27 bias
L.P. FILTER OUTPUT
H SIGNAL
FIG. 28

Inventor
GILBERT L. HOBROUGH
by: J. Richard Cavanagh

Dec. 13, 1960 G. L. HOBROUGH 2,964,639
IMAGE INSPECTING SYSTEM AND METHOD
Filed Aug. 17, 1956 6 Sheets-Sheet 4

SCAN 1

SCAN 2

UNIFORM CORRELATION PERFECT ALIGNMENT

NON-UNIFORM CORRELATION MISALIGNMENT IN ZERO DIRECTION

NON-UNIFORM CORRELATION MISALIGNMENT IN 120° DIRECTION

ZERO CORRELATION

ZERO SIGNAL

Inventor
GILBERT L. HOBROUGH
by: J. Richard Cavanagh

Dec. 13, 1960  G. L. HOBROUGH  2,964,639
IMAGE INSPECTING SYSTEM AND METHOD
Filed Aug. 17, 1956  6 Sheets-Sheet 5

Inventor
GILBERT L. HOBROUGH
by: J. Richard Cavanagh

Dec. 13, 1960 G. L. HOBROUGH 2,964,639
IMAGE INSPECTING SYSTEM AND METHOD
Filed Aug. 17, 1956 6 Sheets-Sheet 6

Inventor
GILBERT L. HOBROUGH
by: J. Richard Cavanagh

United States Patent Office 2,964,639
Patented Dec. 13, 1960

2,964,639

IMAGE INSPECTING SYSTEM AND METHOD

Gilbert Louis Hobrough, Oshawa, Ontario, Canada, assignor, by mesne assignments, to Hunting Survey Corporation Limited, Toronto, Ontario, Canada Filed Aug. 17, 1956, Ser. No. 604,843

14 Claims. (Cl. 250—217)

This invention relates to an image inspecting system and to the method of applying same for the examination of a photograph or other image and to a scanning device particularly adapted for use in photogrammetry.

In the prior art of photogrammetry, two images in the form of two stereophotographs of the same terrain are simultaneously visually inspected through optical mechanism to accomplish registry of selected points of the two photographs in order to establish the three coordinates of a selected point. Various types of complex apparatus have been devised to facilitate the plotting of terrain and relief maps from stereophotographs, all of which devices depend upon the visual ability of the operator. Stereoplotting operators are subjected to long fatigue; therefore, the prevention of human error presents a primary problem of photogrammetry. In addition, the tedious nature of the work limits the speed of operation to the speed and response of the operator requiring the operator not only to sense, that is, identify identical points in the two photographs, but to correlate the two points in such a way as to extract three coordinate information from the correlating operation, which information, in turn, is applied to the plotting operation. The necessary skill in depth of perception on the part of the operator requires the special training or personnel selected for this work.

While present stereoplotting machines are mechanically capable of carrying the coordinate information of a selected point once obtained by a visual sensing and correlating operation directly to the graphic process of providing a map or other representation of the information, the speed and accuracy of the operation is necessarily limited in all prior devices by the skill of the operator.

It is the main object of the present invention to achieve a sensing operation whereby a point within an image may be selected and identified without resorting to visual means of an operator.

It is another object of the invention to provide an image inspecting system adapted for photogrammetry, in which a selected point in one image is automatically correlated to a corresponding point of the other image of a stereo pair.

It is a further object of the invention to provide an image inspecting system adapted for photogrammetry in which corresponding points are sensed in stereo image pairs and are correlated in a manner automatically providing three-dimensional coordinate information concerning the point inspected.

The term "image" as employed in this specification requires more comprehensive definition than the ordinary dictionary meaning attributed thereto. While the term "image" herein embodies a visual representation of an object, it must be understood that the formation of an image requires the activation of a film photograph or other graphic record by light or other radiant energy and that in the true sense, an image is an energy pattern embodying gradations of radiant energy potential which is representative of the original subject which the photograph or graphic record is intended to represent. Accordingly, reference hereinafter to the "sensing of an image" will embrace the meaning of extracting information energy in the form of energy potential gradations from an image formed by the activation of an object or the representation of an object by radiant energy.

Other objects of the invention will be appreciated by a study of the following specification taken in conjunction with the accompanying drawings.

In the drawings:

Figure 1 is a diagram illustrating the scanning of photographic film emulsion grains by a scanning spot of corresponding size;

Figure 2 shows a signal responsive to the scanning operation of Figure 1;

Figure 3 is a diagram illustrating the scanning of photographic film emulsion grains by a scanning spot of much larger size;

Figure 4 shows a signal responsive to the scanning operation of Figure 3;

Figure 5 is an illustration of a circular scanning pattern according to the invention;

Figure 6 shows a typical signal responsive to scanning by the scanning method of Figure 5 showing a one cycle wave form;

Figure 7 is a perspective diagram of a circular scanning device of the invention revealing the mode of operation thereof;

Figure 8 is an expanded sectional view of a scanning element or disc of the device of Figure 7 used for a circular scanning function;

Figure 9:
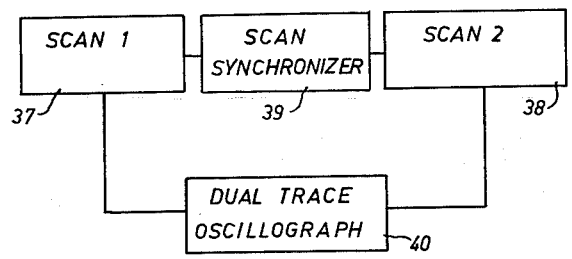
Figure 10:
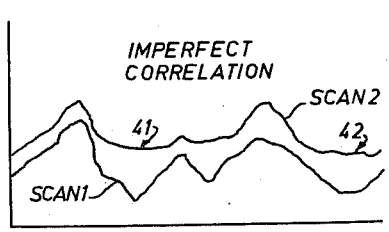
Figure 11:
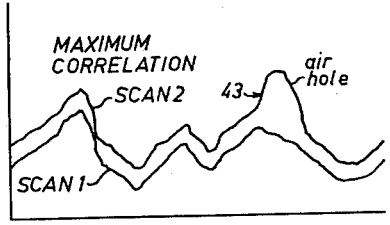
Figure 12:
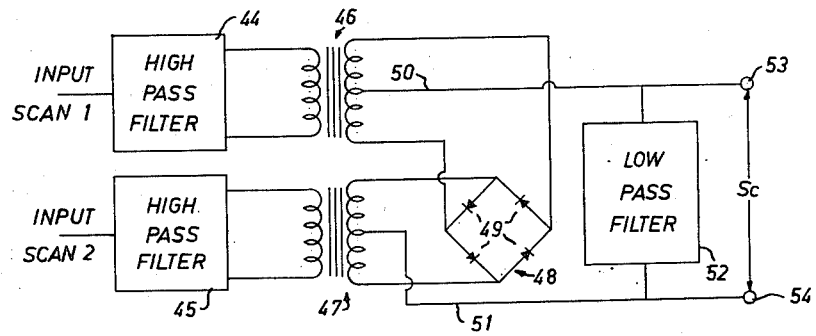
Figure 13:
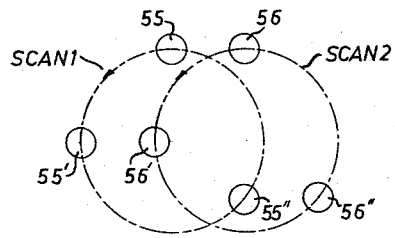
Figure 15:
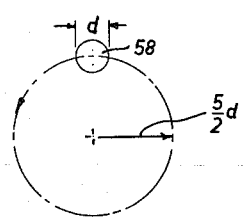
Figure 16:
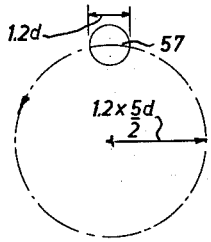
Figure 25:
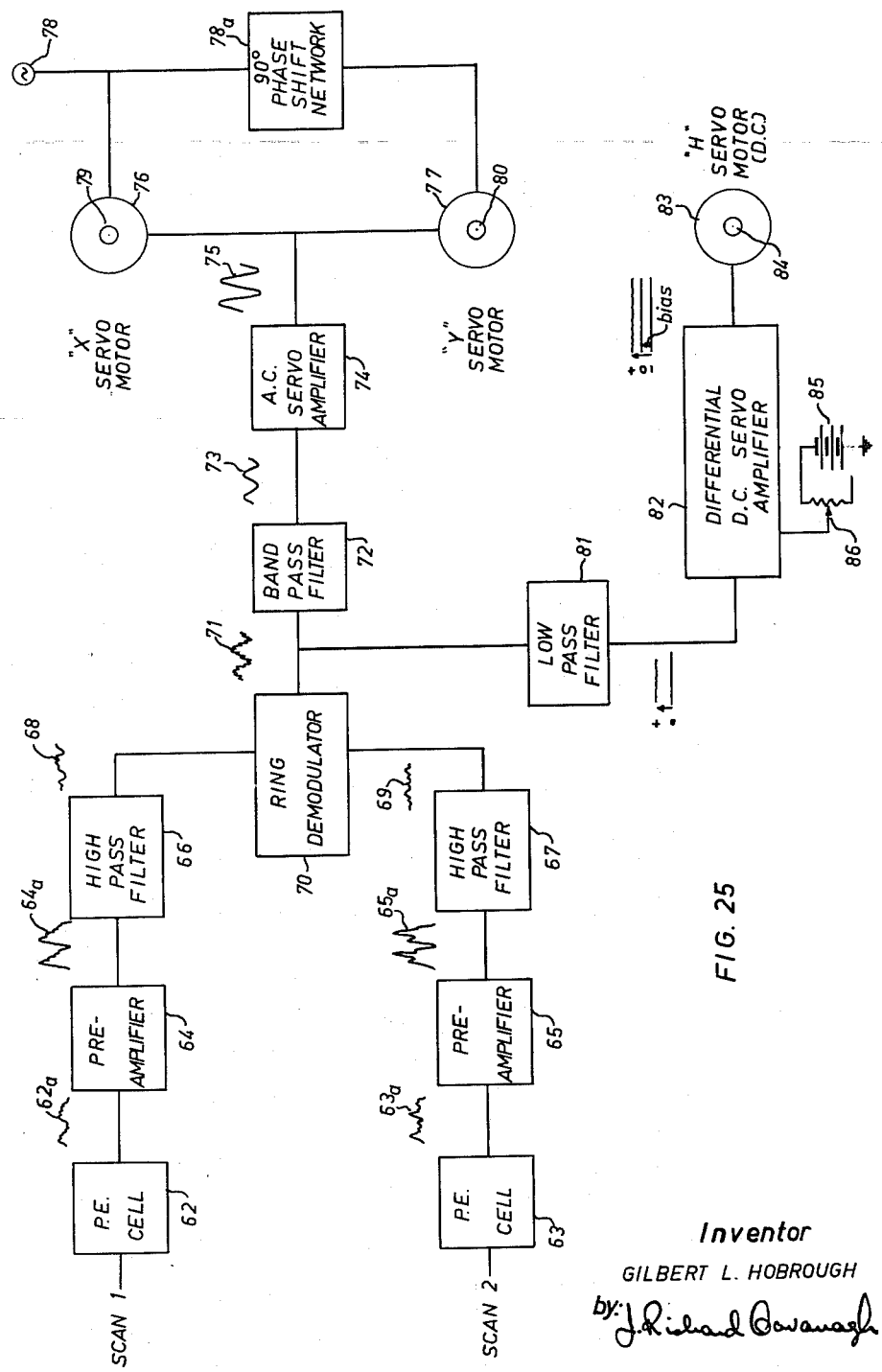
Figure 29:
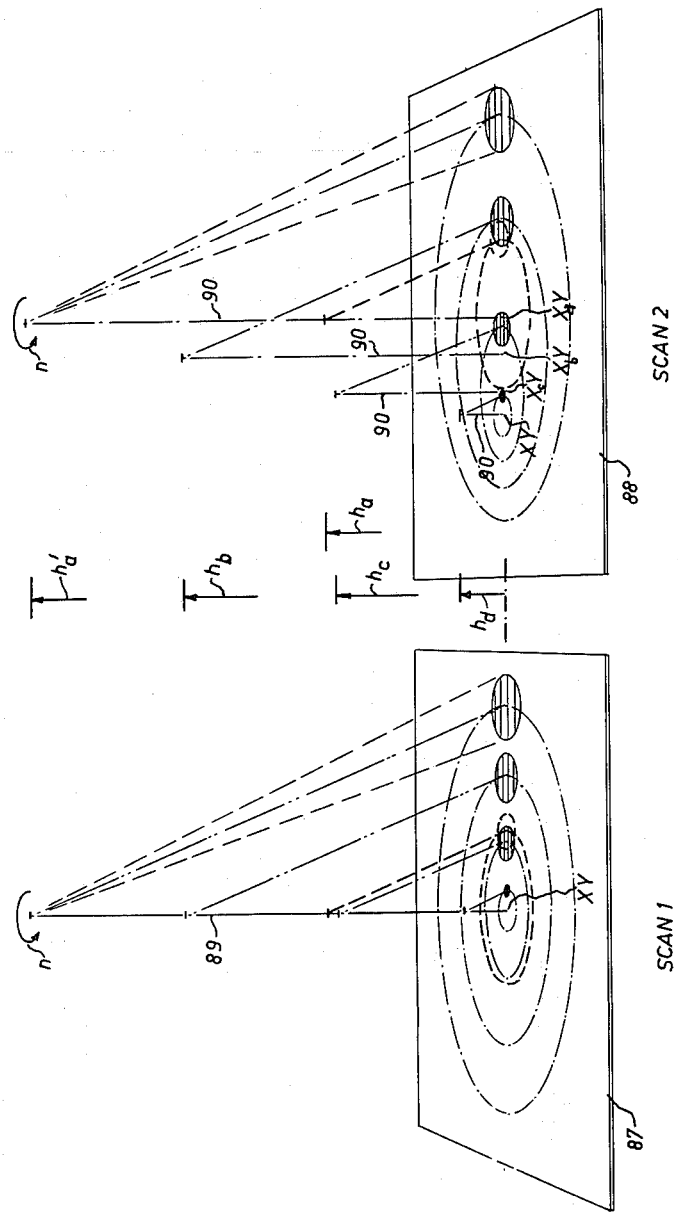

Figure 9 diagrammatically illustrates the dual scanning of similar images to identify common points therein;

Figure 10 shows curves viewable on the dual trace oscillograph of Figure 9 for a condition of imperfect correlation of points in two images;

Figure 11 shows the curves of Figure 10 modified to a condition of similarity responsive to a condition of maximum correlation of points in two images in the method of Figure 9;

Figure 12 is an electrical schematic showing a correlating circuit in the form of a ring demodulator or multiplying device adapted to multiply signals of the form shown in Figures 10 and 11 to enable a signal Sc to be obtained which will indicate a condition of correlation as opposed to zero correlation;

Figure 13 is a scanning diagram illustrating the superposition of two circular scanning patterns of the invention of the same size out of registry;

Figure 14 is a wave form chart illustrating the action of the demodulator of Figure 12 under conditions of correlation and zero correlation;

Figures 15 and 16 illustrate constant difference scanning patterns according to a modification of the invention and enabling a correction signal to be obtained between maximum and zero correlation;

Figures 17 to 24 show superimposed constant difference scanning patterns for different degrees of alignment and the demodulated signal obtainable therefrom;

Figure 25 is an electrical schematic of signal handling apparatus for utilizing the signals obtained from dual constant difference scanning as in a coordinate correcting system for one scan to thereby achieve maximum correlation;

Figure 26 is a wave form chart showing constant difference dual scanning signals for a condition of perfect correlation;

Figure 27 is a wave form chart similar to Figure 26 but showing a lack of alignment in an X coordinate direction;

Figure 28 is a wave form chart similar to Figure 26 but showing a lack of alignment in a Y coordinate direction; and Figure 29 is a diagrammatic perspective illustration of scanning pattern expansion to achieve correlation.

According to the system and method of the invention, a point within an image is defined by information within the image about the point. Thus, an image is examined over a selected area about the point desired to be identified. For any other point in the image, the information about that point will not be the same. The resolution of information in the image; that is, the smallest area of information which is significant therein, will determine the minimum size of area to be examined to define a point in the image and will thus determine the precision of the inspecting system and sensing operation to be described.

According to the invention, a direct current signal may be obtained responsive to the radiant energy from an area defined by a scanning spot. The image is scanned in an annular area about the point to be defined by moving the scanning spot on a radius of eccentricity about the point at a constant angular velocity to obtain a variable voltage signal responsive to the density of the information scanned. The annular scanned area is of minimum size determined by the resolution of the image and "permissible noise" in the resulting varying voltage. The alternating current signal thus formed is responsive to information from the image within the annular scanned path about the selected point.

In practice, the resolution of a film such as is used for stereographic plotting requires that the scanning spot be of a size corresponding to the film resolution, that is, of the order of about 0.1 millimeter. By this means, the graininess of a film in which grain size is less than film resolution, will be rendered less predominant than the density information derived therefrom. Assuming a given size of scanning spot, the greater the area scanned, that is, the greater the radius of eccentricity, the greater will be the amount of information available from the alternating current signal produced.

In Figure 1, an image 10 comprising an illuminated photographic emulsion is traversed by scanning spot 11 of a diameter substantially equal to minimum emulsion grain size indicated by the circles 12. As a result, a voltage signal responsive to such scanning will be greatly influenced by the shape of the grains as indicated by the trend curve 13 of Figure 2 having relatively large amplitude random noise 14 therethrough.

As shown in Figure 3, the scanning spot may be enlarged as is indicated at 15. The shape of grains 16 of image 17, being much smaller than the diameter of scanning spot 15, do not greatly influence the signal level of information represented by trend curve 18 having relatively low amplitude noise 19.

A scanning spot of minimum size corresponding to film resolution will be larger than the average grain diameter in size. If the scanning spot is moved on a circular path of minimum radius of eccentricity, the length of the scanning path in one revolution or scanning path will be insufficient to deliver information at a frequency significantly different from scanning the frequency fundamental. If the length of the scanning path in one scanning cycle is as long as possible, a large number of grains will be traversed and then the information frequency will be very high and can be easily separated from the scanning frequency fundamental in signal handling circuitry. This would mean that the diameter of the scanning path would be very great in comparison to the diameter of the scanning spot; that is, the scanning spot would move on a large radius. On the other hand, it is desired that information to identify a particular point should be obtained as close to that point as possible.

A significant separation of information frequency and fundamental scanning frequency occurs when the diameter of the scanning path is such that the length of the scanning path is approximately twenty scanning spot diameters or greater. Substantially the optimum conditions are achieved for a sixty cycle fundamental scanning frequency when the diameter D of the scanning path is about five times the diameter $d$ of the scanning spot 20 as shown in Figure 5. The spot 20 moves counterclockwise on a radius of $$\frac{5d}{2}$$

about the point 21. By this means, a substantial optimum resolution is achieved and a satisfactory wave form of usable signal-noise ratio is obtained to define point 21 such as is indicated by the typical wave form 21a of Figure 6.

Typical scanning apparatus

One form of suitable scanning apparatus adapted for circular scanning according to the invention, is shown in Figures 7 and 8 wherein a synchronized motor 22 operating for example at 3600 revolutions per minute (sixty cycles per second), causes the eccentrically apertured lens disc 23 to rotate about the lens axis 24 to effect a scanning of a photograph 25 about a point 26 thereon on axis 24 by light rays 27 crossing the axis 24 at focal point $f_1$ and directing such rays to the second focal point on said axis at which the photoelectric cell 28 is located. The image, that is, the light energized photograph 25 (the source of light energy not being shown) is scanned by rotation of the eccentric lens portion 29 formed by placing an eccentric aperture member 30 between two lens halves 31 and 32 as shown in Figure 8. The eccentric aperture member 30 comprises a sheet of opaque material having an iris opening or hole 33 therein. Obviously, a portion of a complete lens eccentrically mounted in the manner shown would provide an equivalent.

It will be apparent that by changing the distance $h$ between the image and the focal point $f_1$, the diameter of the scanning spot 35 will vary, as will the diameter of the scanning path 36 though the ratio of the diameter of the scanning spot to the path thereof remains constant.

It will be appreciated that in a general sense, the scanning system of Figure 7 comprises a device effecting circular scanning of an image by an image responsive signal generator and that the physical embodiment illustrated does not limit the variations which might be practiced in the type of apparatus set up; for example, the light source could be directed by the scanning disc 34 to provide a rotating light spot for the scanning spot 35 and a large photoelectric cell arranged to receive a light from the scanned path 36. An eccentric mirror portion might be employed in place of the lens portion 29. In general, however, optical equivalents may be practiced without departing from the circular scanning concept set forth as will be readily appreciated by persons skilled in the optics arts.

Dual scanning inspection

The invention contemplates the dual inspection of stereo pairs of photographs for the purpose of identifying corresponding points. Therefore, each of the photographs is scanned individualy by a suitable scanning system such as that disclosed in Figure 7. A signal results for each of the images scanned. This operation is indicated diagrammatically in Figure 9 by a block 37 carrying the wording "Scan 1" thereby indicating a circular scanning device scanning a first image about a selected point and generating a signal responsive to the scanned information about the point in the image. The block 38 carrying wording "Scan 2" indicates a corresponding scanning device for a second photograph of a stereo pair and which is adapted to generate signal responsive to the scanned information. The devices indicated by the Scan 1 and Scan 2 are synchronized by a scan synchronizer 39. Both of the scan signals connect to a conventional dual trace oscillograph 40. The scan synchronizer 39 represents any suitable means for synchronizing the two scanning devices. Thus, for example, the synchronous motor 22 of Figure 7 may be synchronized electrically by conventional means with a companion synchronous motor of a second scanning device as will be appreciated by skilled persons.

Single cycle signal wave forms obtained from Scan 1 and Scan 2 signal channels appear on the screen of the oscillograph 40 somewhat in the manner illustrated in Figures 10 and 11. Assuming that the scanning spot and scanning circle diameter for Scan 1 are identical to the scanning spot and scanning circular diameter for Scan 2 and that the point being examined on each photograph of the stereo pair does not exactly correspond to the other, then the signal for Scan 2 may embody a departure such as in the regions 41 and 42 as compared with the wave form of Scan 1. The information scanned about the points is therefore not in perfect agreement and the correlation of these points may be said to be imperfect.

Assuming, however, that Scan 2 has been moved to precisely a point corresponding to the point of inspection of Scan 1 on the first photograph of the stereo pair, then the scan signals should be theoretically identical and maximum correlation will be achieved. It is of interest to observe that imperfections in the image as, for example, an air hole in the film emulsion of the photograph examined by Scan 2, may give rise to a distortion 43 in the signal curve for Scan 2. One of the photographs may be of lesser or greater average density than the other and accordingly the curves may be separated by a potential representing difference in average density. The invention contemplates that each of the scan signals may be passed through a high pass filter after suitable preamplification to remove the direct current components therefrom and to eliminate the scanning frequency component of the signals whereby a condition of maximum correlation will be shown on the dual trace oscillograph by substantially a single line and imperfect correlations will be indicated by departures from a single wave form.

The system illustrated by Figures 9 to 11 is useful for indicating a presence or lack of correlation. Where it is desired to operate some device responsive to the condition that a desired degree of correlation has been achieved, then a signal responsive to such condition may be provided by the signal multiplying circuit of Figure 12 referred to hereinafter as a "ring demodulator." Thus, the signals from Scan 1 and Scan 2 are fed as inputs through the high pass filters 44 and 45 to transformers 46 and 47 respectively arranged in bridge connection by their secondaries to the apices of the uni-directional rectifying bridge 48 embodying rectifying means 49 in each of the four arms passing current in the same direction. The secondaries of the transformers 46 and 47 deliver the resulting multiplied and hence demodulated signals by their central tap lines 50 and 51 respectively to the band pass filter 52 to terminals 53 and 54 from which a correlation signal Sc may be obtained. Under a condition of correlation, signal Sc is substantially a direct current signal. Where no correlation exists, an alternating current signal having little or no direct current component and of random frequency results. Accordingly, a direct current responsive device of any one of a number of well known forms will indicate when correlation has been achieved without resorting to the requirement that the operator make any visual examination of the stereo pairs of photographs or examination of signals responsive to information therefrom. By this means, the visual operation in respect to the sensing of information defining a point in an image and determining whether or not a corresponding point is being examined on the other photograph of a stereo pair, is eliminated.

In Figure 13, the scanning paths of Scan 1 and Scan 2 are shown superimposed in order to bring out the limitations which attend in employing the scanning system of the invention in such manner that the scanning spot and scanning circle of Scan 1 are of the same diameters as the scanning spot and scanning circle of Scan 2. Scan 2 is shown slightly displaced from Scan 1 in Figure 13. It will be apparent that the scanning spot 55 of Scan 1 can never traverse the same information as scanning spot 56 at the same instant. It is only when Scan 1 and Scan 2 are substantially exactly in registry over identical points that there can be any indication of correlation.

The curve chart of Figure 14 illustrates correlation and no correlation conditions for the Scan 1 and Scan 2 signals where the scanning patterns exactly correspond in size of scanning spot and diameter of scanning circle. Thus, under a condition of correlation, the Scan 1 and Scan 2 signals are identical and when multiplied, provide a positive fluctuating direct current signal responsive to information in the areas scanned which, when subjected to the action of the low filter 52, delivers a direct current signal. However, under the no correlation column of Figure 14, the channel 2 signal is quite different from that of channel 1 and as a result, the multiplied signal has both positive and negative values which, when filtered, result in a signal having little or no direct current component and may be regarded for all practical purposes as a "zero signal."

*Constant difference dual scanning*

While the identical scanning of stereo pairs of photographs can give information indicating whether an identical point has been sensed, no other information can be derived unless one of the scans is modified to enable a directional sense to be given to the information obtained. The invention therefore contemplates that one of the scans should be slightly different from the other and that such difference should be constant. Preferably, a circular scanning is employed wherein the scanning spot 57 of Scan 2 is 1.2 times the diameter of the scanning spot 58 of Scan 1 as shown in Figures 15 and 16. The ratio of five-to-one of the diameter of the scanning path to the diameter of the scanning spot is maintained the same in each of the scans. The ratio of five-to-one is indicated by way of example in Figures 15 and 16.

Figure 17:
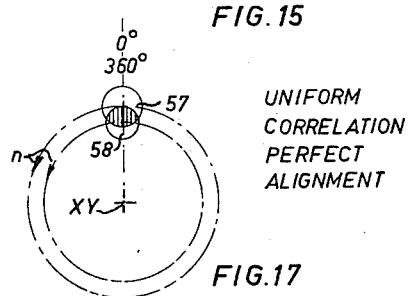
Figure 18:
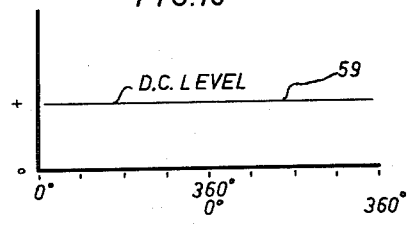

In order to appreciate the effect of providing a constant difference in size of the scanning patterns, Scan 1 and Scan 2 are shown superimposed in Figure 17 in precise registry over the point XY. The scanning spots 57 and 58 are shown at the zero scanning position; that is, the position from which a scan proceeds in the direction of the arrow *n*. The condition shown is one of perfect alignment of the scans over the point XY in each stereophotograph examined illustrating a condition of maximum correlation. In Figure 18, the scanning signals are processed through high pass filters and a multiplying demodulating circuit similar to Figure 12 but showing a band pass filter operating at scanning frequency to obtain a signal voltage represented by the direct current signal 59 of Figure 18.

Figure 19:
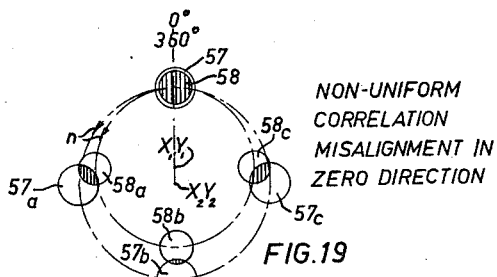
Figure 20:
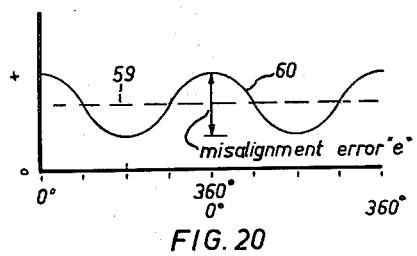

Scan 1 and Scan 2 may be out of alignment in the zero direction as indicated in Figure 19 in which the scanning spots are shown at their progressive positions by subscripts *a*, *b* and *c*. The resulting signal is indicated by numeral 60 in Figure 20 and comprises a wave form rising to a maximum at the zero phase position for complete registry of scanning spot 57 with scanning spot 58. At the 90° position respectively of the two scans, the scanning spots 57a and 57b are out of alignment; that is, out of phase and are likewise out of phase in the opposite phase direction at the 270° phase angle indicated at 57c and 58c. In the 180° position, the scanning spots 57b and 58b are in phase alignment but there is minimum correlation of information at this point. Accordingly, the condition shown in Figures 19 and 20 is one of non-uniform correlation due to misalignment in the zero direction. The resulting signal 60 extends above and below the former direct current level line 59 and in total amplitude represents a misalignment error substantially equal to the diameter of the scanning spot at zero phase.

Figure 21:
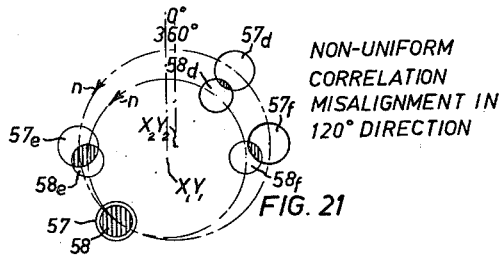
Figure 22:
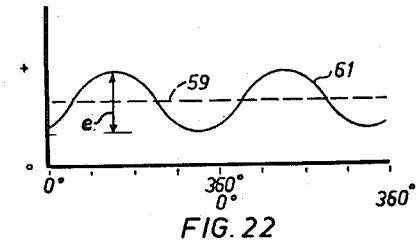

In Figures 21 and 22, a condition of imperfect correlation due to misalignment of the scanning paths in the 120° phase direction is shown. In this case, the scanning spots 57 and 58 are shown in perfect registry at the 120° phase location and at a position of maximum misalignment in the 300° phase position indicated by 57d and 58d. A phase misalignment occurs as between the two scanning spots at all other positions; for example, at positions indicated as at 57e, 58e, 57f, 58f. As a result, the wave form 61 representing the signal obtained as before, is similar to wave form 60 of Figure 20 but is merely out of phase therewith, being displaced laterally along the curve base to displace the wave form 61, 120° out of phase with the wave form 60.

Figure 23:
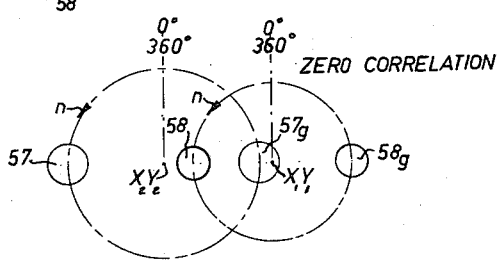
Figure 24:
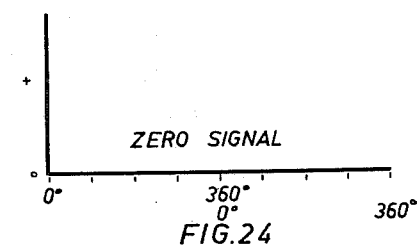

It must be apparent that Scan 1 and Scan 2 can be so completely out of alignment that no correlation exists in the information scanned by each. This condition is shown in Figure 23. The scanning spots 57, 58 and 57g, 58g cannot scan the same in same information. Accordingly, a zero signal is obtained as represented in Figure 24 where no signal voltage is shown for a condition at which no correlation exists.

If Scans 1 and 2 have scanning patterns of the same size, scanning identical information under a condition of ideal maximum correlation, then the resulting signal will be a direct current signal of maximum value. However, in the present instance, the scans are not of exactly the same size and a constant difference in their relative magnitude is always maintained. Accordingly, even when viewing identical images, the scan signals will not be identical and therefore the output potential of the demodulator circuit hereinafter sometimes referred to as the "correlating circuit" (see Figure 12) will be somewhat less than maximum amplitude. When the scanning patterns are misaligned as shown by way of example in Figures 19 and 21, the scanning spots will sense a maximum of similar image detail at one point in the scanning cycle and a lesser amount of similar image detail as the scanning spots recede from a condition of registry. Accordingly, the output of the correlating circuit will rise and fall once for each revolution of the scanning spots, that is, at the scanning frequency. The phase or time relationship between the peaks of this scanning frequency signal and the peaks of the alternating current supply driving the scanning motors 22 (Figure 7) will depend upon the angular direction of the error from the zero phase position. The average value, that is, the direct current component of the resulting multiplied, i.e., demodulated, signal, will be of lesser amplitude as correlation is reduced until under the conditions shown in Figures 14 and 24, the signal becomes zero.

*Typical circuit*

A typical block diagram circuit arrangement forming a part of the scanning system according to the invention, is illustrated in Figure 25 wherein each of the components and circuit devices will be readily recognized by persons skilled in electronics arts; it being understood, however, that the combinations of known components set forth in this diagram are deemed a part of this invention. As shown, the two photo-electric cells 62 and 63 for Scan 1 and Scan 2 or equivalent radiation sensitive devices responsively generate the two signal voltages 62a and 63a amplified by preamplifiers 64 and 65 to signal wave forms 64a and 65a which proceed through the high pass filters 66 and 67 to remove the scanning frequency component whereby signal wave forms 68 and 69 represent the scanned information for each scan. By way of example, the high pass filters of conventional construction may be designed to pass frequencies greater than two hundred cycles per second when a scanning frequency of sixty cycles per second is employed. The signals 68 and 69 are fed to the ring demodulator 70, the same being of a form shown in Figure 12 to obtain a relatively wide band signal 71 representing imperfect correlation. The band pass filter 72 is adapted to pass substantially only a selected frequency corresponding to scanning frequency. In the present example, a sixty cycle band pass filter is used, from which a wave form will be obtained to represent phase misalignment information (see Figures 20, 22, 24, 26, 27 and 28). The sixty cycle servo amplifier 74 amplifies the signal 73 to a usable form 75 applied to the coordinate servo motors 76 and 77 for coordinates X and Y and driven from a sixty cycle supply line 78. The coordinate servo motors are adapted to operate at 90° out of phase by reason of the 90° phase shift network placed therebetween in supply line 78. As a result, the servo motors will rotate their shafts 79 and 80 in forward or reverse, responsive to phase information in the signal 75 fed thereto in turn representing correlation information. The degree of correlation between Scan 1 and Scan 2 is thus capable of being represented by the two coordinate mechanical motions of these shafts having regard to the degree of phase alignment of the scans. These functions are brought out more clearly in Figures 26, 27 and 28.

In Figure 26, the signals for Scan 1 and Scan 2 are shown after passing through the high pass filters and are illustrated therebelow in combined form as obtained from the demodulator output for a condition of maximum correlation. The resulting demodulated and filtered signal is of substantially direct current form containing no phase information, as a result of which the coordinated servo motor shafts 79 and 80 will remain stationary.

Assuming, however, that a scan phase alignment in the 90°, 270° direction represents the X coordinate information and that a dissimilarity of signals from Scan 1 and Scan 2 represents such misalignment, as shown in Figure 27, then the multiplied signals will have negative values in this phase direction whereby the phase misalignment signal Sc represents the degree of misalignment in the X direction. In this case, the 90° phase shift network 78a of Figure 25 will render the Y servo motor unaffected by the X phase shift signal and the latter will cause rotation of the shaft 79 of the X coordinate servo motor in the appropriate phase direction.

Similar results obtain for scanning misalignment in the zero–180° direction represented as a Y coordinate direction. The signal for Scan 2 will depart from the signal information of Scan 1 by phase difference apparent in the negative values of the multiplied wave form which, after being filtered by the band pass filter 72, embodies phase information adapted by reason of the phase shift network before described to actuate shaft 80 of the Y coordinate servo motor in the appropriate direction. The resulting wave form 75 shown in Figure 25 may embody both X and Y coordinate information effecting rotation of both shafts 79 and 80. It will also be apparent that mechanical motion available from the shafts 79 and 80 may be applied to adjust the location of Scan 2 relative to the coordinate axis of the photograph from which it is deriving information. Therefore, the system of the invention contemplates that once a condition of imperfect alignment is achieved, the signal thereby obtained may be utilized to reposition one of the scans continuously until the alignment reaches a maximum. This function is only possible if some correlation exists from which phase information representing misalignment can be obtained.

*Establishing correlation*

As before mentioned, the direct current component of the signal 71 as shown in Figure 25 will rise to a maximum value under a condition of maximum correlation and will be of lesser value down to zero as correlation becomes imperfect and finally zero. The information thus obtainable from the signal 71 may be utilized by passing the signal through the low pass filter 81 and differential direct current servo amplifier 82 to drive the direct current servo motor 83 having a shaft 84. Since the information in the direct current component of signal 71 is uni-directional, it is necessary to provide a bias supply 85 for the differential servo amplifier 82 of a value making the direct current component of signals for a condition of zero and substantially zero correlation conditions, negative (see also Figures 26, 27 and 28). By this means, the shaft 84 may be rotated in one direction for a correlation condition of a predetermined value up to maximum correlation and will operate in the reverse direction under conditions of less than the predetermined value of correlation to zero correlation. The potentiometer 86 permits adjustment of bias voltage and operates as a resolution control.

As before described with reference to Figure 7, if the distance between the scanning device and the image 25 is increased, then the diameter of the scanning path 36 increases. In a double scanning system, if both Scan 1 and Scan 2 are at all times the same distance from the image being scanned but this distance is adjustable so that the scanning patterns become controllably larger or smaller by way of simultaneous motion of scanning devices in the same direction, then correlation can be achieved if the scanning patterns are made very large, regardless of a substantial misalignment of the scanning axis as compared with the size of the images being scanned. For example, it may be necessary to expand the size of the scanning patterns almost to the borders of the images before there is a sufficient similarity of information scanned to indicate a condition of correlation in the smallest degree.

Dual scanning pattern expansion for the examination of stereo pairs of photographs is illustrated diagrammatically in Figure 29 relative to the function of establishing correlation. Scan 1 and Scan 2 scan respective images 87 and 88 at the same cyclic scanning rate and are adapted to be simultaneously moved in identical manner toward or away from the images to change the length of their scanning axes 89 and 90 shown intersecting the plane of the images at substantially right angles at the point X, Y on Scan 1 image 87 and initially at the point $X_a$, Y on Scan 2 image 88. By way of example, it will be assumed that the initial scanning height $h_a$ is any convenient initial scanning height or distance. Scan 2 must move to the left to find the point X, Y in image 88. No error in the Y coordinate is indicated in the illustration.

Assume that at the scanning height $h_a$ no correlation exists and that accordingly, the signal 71 of Figure 25 will be substantially zero; or assume that at the height $h_a$ the degree of correlation may be less than the predetermined correlation desired as determined by bias adjustment 86. By reason of the bias voltage 85 of Figure 25, the shaft 84 of the direct current servo motor 83 will rotate in a "reverse" direction. Assuming a normal direction to the plane of the images 87 and 88 to be termed herein an "H direction" and that the shaft 84 is usable for motion in an H coordinate direction, the said motor may be utilized according to this invention to move the scanning devices simultaneously outwardly during reverse rotation of shaft 84 to thereby expand the scanning patterns.

The X motor shaft 79 will move responsive to X error information in signal 73 though at substantially zero correlation or at below the predetermined value of correlation the signal may be of insufficient magnitude to overcome the inertia of the servo motor. In practical effect, therefore, the outward movement of Scans 1 and 2 under conditions of less than permissible correlation, is substantially directly outwardly until the scanning patterns have expanded to a point at which correlation is significant at the height $h_a'$. Upon correlation above a predetermined minimum value being established, the scanning axis of Scan 2 will shift to the left under action of the shaft 79 of the X servo motor of Figure 25 while the direct current component of signal 71 will be sufficiently positive to overcome the bias 85 and to drive the H servo motor shaft 84 in the positive direction moving the scanning devices toward the images and thereby effecting contraction of the scanning patterns. Once a condition of correlation exists, the correction is continuous in the X, Y and H directions as is indicated at the progressive heights $h_b$ and $h_c$ until a maximum correlation is achieved at a height $h_d$ at which the scanning axis 90 of Scan 2 is aligned directly over the point X, Y of image 88.

The size of the scanning patterns is subject to continuous adjustment so that expansion occurs under conditions of less then a predetermined degree of correlation and contraction occurs at values above the predetermined value up to maximum correlation so that the smallest scanning pattern possible is automatically sought by the system of the invention in the interests of precision. If, for any reason, correlation disappears or is greatly reduced, the scanning pattern immediately expands until correlation has been restored upon which contraction immediately occurs.

Poor correlation may be caused by a number of conditions such as poor local resolution in the image, local emulsion distortion, shadowing by abrupt height changes in a terrain as represented on a film, masking by foreign particles and film imperfection. In any of these circumstances, an automatic increase in scanning pattern dimension occurs to restore correlation to thereby achieve a maximum precision having regard to the limitations of the images being examined. If, for any reason, misalignment, i.e., the scanning error or departure, should become greater than approximately the diameter of the scanning spot, then all correlation disappears and recentering would not be possible, were it not for automatic adjustment of scanning pattern size by motion of the scanning devices in the H coordinate direction until the size of the scanning spots corresponds to the error or departure. The desired degree of correlation being thus achieved, the scanning patterns automatically shrink and find the corresponding point of maximum correlation in Scan 2.

The bias control 86 should be adjusted to obtain the smallest size scanning pattern possible having regard to reliable operation of the X and Y servo motors.

*Mutual orientation of image pairs*

That portion of this invention relating to the dual scanning of image pairs must necessarily take into account not only scanning misalignment but also image misalignment relative to the zero phase position of the scanning path in each case. In stereo plotting methods, each of the images or photographs of a stereo pair is aligned with respect to a common reference axis to parallel the Y coordinates and align the X coordinates of the photographs. The stereo images are thus mutually oriented. Obviously, a constant error may be permitted so that one image may be twisted or tipped relative to the other so long as the error is cancelled out or otherwise taken into account in plotting procedures.

Essentially, the same conditions of mutual orientation of image pairs must be satisfied to enable dual scanning inspection according to the invention. Each cyclic scan sweep of each scan must begin at an angular location about the point thereby examined which corresponds in each image, otherwise a phase lag will occur in the signal from one of the scans to a degree which, if angular misalignment or lack of orientation is greater than the angle subtended by the diameter of the scanning spot, renders correlation impossible though the scanning axes are otherwise in perfect registry over identical points.

It is therefore contemplated that mutual orientation of the stereo image pairs be accomplished by any one of a number of prior art methods before dual scanning inspection is practiced. Of course, mutual orientation may also be accomplished through the scanning system itself by orienting the scans to their respective images and introducing an alignment constant in the scan synchronizer.

Regardless, the stereo images being scanned are mutually oriented through the scanning system and must be aligned either physically each with respect to the other or within the system itself.

The method and system of the invention may be utilized in facilitating mutual orientation of stereo image pairs. Assuming a dual scanning of unoriented stereo image pairs, a lack of correlation will expand the scanning patterns to the maximum. If no contraction takes place, one of the images is slowly rotated manually about its scanning axis until pattern contraction occurs.

*Summary*

In a general sense, the invention defines a novel method of inspecting an image to define a point therein by information about the point. An electrical signal responsive to the information obtained may be utilized in various ways. Preferably, a circular scanning operation is accomplished with the apparatus set forth to enable a maximum of precision to be achieved in particular in dual scanning operations and systems as set forth.

Corresponding points in two images can be found and correlated by scanning one image with a scanning spot of an image information sensitive detector as described (Figure 7) by moving the spot about the point therein at a radius defining a scanning path of predetermined length and preferably about twenty times the diameter of the spot. A similar simultaneous constant difference scan is made of the other image in phase and velocity synchronism about any non-corresponding point. First and second scan signals are then obtained and the constant difference scan is moved over its image responsive to scanning misalignment available from the signals. The signals are preferably processed by multiplication and the resulting signal filtered to obtain a direct current signal representing uniform correlation when the points correspond, a phase wave form signal representing non-uniform correlation and the phase direction of non-uniformity when the image points correspond substantially but not exactly and a zero signal representing zero correlation when the points do not correspond. The constant difference scanning pattern is moved responsive to phase information in the phase wave form signal to render correlation more uniform. Both of the scanning patterns are simultaneously expanded responsive to said zero signal and are simultaneously contracted responsive to said direct current signal.

The various signal wave forms shown in the drawings can only generally indicate the nature of the signals and operations involved for the reason that the illustration of a sufficient number of pulses in one cycle is not practical. At least twenty descrete bits of information per cycle would be evident in the scan signals of Figures 14, 26, 27 and 28 if the representations corresponded to the true nature of the signals. It is therefore intended that the various wave forms presented be accepted only as a general indication of the functions represented and not as accurate curves from which measurements or detailed comparisons can be made. The various wave forms will, however, be found useful in gaining an understanding of the scope and sequence of the signal generating and handling operations set forth herein.

While there has been described what is at present considered a preferred embodiment of the present invention, it will be appreciated by those skilled in the art that various changes and modifications can be made therein without departing from the essence of the invention and it is intended to cover herein all such changes and modifications as come within the true spirit and scope of the appended claims.

What I claim as my invention is:

1. The method of correlating corresponding points in two stereo images each having similar information about said points therein and comprising: establishing a scanning spot; scanning one of the images with the scanning spot by moving said spot about said point therein at a radius defining a scanning pattern; simultaneously and similarly scanning the other image with a constant difference scanning pattern about any non-corresponding point therein in phase and at a velocity in synchronism with the scanning of the said one of said images; generating first and second electrical scanning signals responsive respectively to the information scanned on said one and said other of said images; multiplying said signals to obtain a multiplied signal of maximum value at maximum correlation of information scanned on said images; and moving the scanning pattern relative to the other image responsive to said multiplied signal to obtain uniform correlation.

2. The method of correlating corresponding points in two stereo images each having similar information about said points therein and comprising: establishing a scanning spot; scanning one of the images with the scanning spot by moving said spot about said point therein at a radius defining a scanning pattern; simultaneously and similarly scanning the other image with a constant difference scanning pattern about any non-corresponding point therein in phase and at a velocity in synchronism with the scanning of the said one of said images; generating first and second electrical scanning signals responsive respectively to the information scanned on said one and said other of said images; multiplying said signals to obtain a multiplied signal of maximum value at maxmum correlation of information scanned on said images; filtering said multiplied signal to obtain therefrom a direct current signal representing uniform correlation when said points on said images correspond, and a zero signal representing zero correlation when said points do not correspond; simultaneously expanding both of said scanning patterns responsive to said zero signal; and simultaneously contracting said scanning patterns to a predetermined minimum size responsive to said direct current signal.

3. The method of correlating corresponding points in two stereo images each having similar information about said points therein and comprising: establishing a scanning spot; scanning one of the images with the scanning spot by moving said spot about said point therein at a radius defining a scanning pattern; simultaneously and similarly scanning the other image with a constant difference scanning pattern about any non-corresponding point therein in phase and at a velocity in synchronism with the scanning of the said one of said images; generating first and second electrical scanning signals responsive respectively to the information scanned on said one and said other of said images; multiplying said signals to obtain a multiplied signal of maximum value at maximum correlation of information scanned on said images; filtering said multiplied signal to obtain therefrom a phase wave form signal representing non-uniform correlation and the phase direction of non-uniformity when said points on said images substantially but do not exactly correspond; and moving the scanning pattern relative to the other image responsive to phase information in said phase wave form signal to render correlation more uniform.

4. The method of correlating corresponding points in two stereo images each having similar information about said points therein and comprising: establishing a scanning spot scanning one of the images with the scanning spot by moving said spot about said point therein at a radius defining a scanning pattern not less than about five times the diameter of the scanning spot; simultaneously and similarly scanning the other image about any non-corresponding point therein at a velocity in synchronism with the scanning of the said one of said images; generating first and second electrical scanning signals responsive respectively to the information scanned on said one and said other of said images; multiplying said signals to obtain a multiplied signal; filtering said multiplied signal to obtain therefrom a direct current signal representing uniform correlation when said points on said images correspond, and a zero signal representing zero correlation when said points do not correspond; simultaneously expanding both of said scanning patterns responsive to said zero signal; and simultaneously contracting said scanning patterns to a predetermined minimum size responsive to said direct current signal.

5. The method of correlating corresponding points in two stereo images each having similar information about said points therein and comprising; establishing a scanning spot scanning one of the images with the scanning spot by moving said spot about said point therein at a radius defining a scanning pattern not less than about five times the diameter of the scanning spot; simultaneously and similarly scanning the other image about any non-corresponding point therein at a velocity in synchronism with the scanning of the said one of said images; generating first and second electrical scanning signals responsive respectively to the information scanned on said one and said other of said images; multiplying said signals to obtain a multiplied signal; filtering said multiplied signal to obtain therefrom a phase wave form signal representing non-uniform correlation and the phase direction of non-uniformity when said points on said images substantially but do not exactly correspond; and moving the scanning pattern on the other image responsive to phase information in said phase wave form signal to render correlation more uniform.

6. A stereo image inspecting and correlating system for identifying corresponding points in two stereo images of a stereo pair having similar information about corresponding points therein and comprising in combination: means defining a scanning spot on each of said images for traversing information thereon; means for traversing said scanning spots over said images on a scanning pathway having a theoretical axis intersecting each of said images at a point therein defined by the image information traversed by the scanning spot thereon; means generating a transient electrical signal responsive to the instantaneous information potential of the image area traversed by each of said scanning spots, each of said signals thereby defining a point in its respective image intersected by the scanning axis of the scanned information about said point; an electrical signal multiplier for multiplying said signals to provide an output signal of maximum value on points of maximum correlation and identity of information in the scanned pathway of said scanning spots on said images and of lesser responsive value at points of lesser correlation and identity on said scanning path; and motor mechanism for moving one of said scanning axes relative to the image it intersects to effect uniform maximizing of said output signal responsive to the latter thereby to achieve maximum correlation and identity of scanning of said images thereby to locate identical points therein.

7. A stereo image inspecting and correlating system for identifying corresponding points in two stereo images of a stereo pair having similar information about corresponding points therein and comprising in combination: means defining a scanning spot on each of said images for traversing information thereon; means for traversing said scanning spots over said images on a scanning pathway having a theoretical axis intersecting each of said images at a point therein defined by the image information traversed by the scanning spot thereon; means generating a transient electrical signal responsive to the instantaneous information potential of the image area traversed by each of said scanning spots, each of said signals thereby defining a point in its respective image intersected by the scanning axis of the scanned information about said point; an electrical signal multiplier for multiplying said signals to provide an output signal of maximum value on points of maximum correlation and identity of information in the scanned pathway of said scanning spots on said images and of lesser responsive value at points of lesser correlation and identity on said scanning path; means mutually orienting said stereo images with respect to said scanning axes providing a predetermined mutual phase relationship of said scanning spots on said images; two output signal responsive motor devices including means for driving one of said scanning axes relative to the image intersected thereby in one co-ordinate direction by one motor device and in another co-ordinate direction at right angles thereto by the other of said motor devices; and an independent energy source for said motor devices including a 90 degree phase shift network therebetween effecting driving of said motor devices inversely responsive to said output signal and reversibly responsive to the phase of the latter.

8. A stereo image inspecting and correlating system for identifying corresponding points in two stereo images of a stereo pair having similar information about corresponding points therein and comprising in combination: projection means defining a scanning spot on each of said images for traversing information thereon and moveable toward and away from said images to control the size of said scanning spot; means for traversing said scanning spots over said images on a scanning pathway having a theoretical axis intersecting each of said images at a point therein defined by the image information traversed by the scanning spot thereon; means generating a transient electrical signal responsive to the instantaneous information potential of the image area traversed by each of said scanning spots, each of said signals thereby defining a point in its respective image intersected by the scanning axis of the scanned information about said point; an electrical signal multiplier for multiplying said signals to provide an output signal of maximum value on points of maximum correlation and identity of information in the scanned pathway of said scanning spots on said images and of lesser responsive value at points of lesser correlation and identity on said scanning path; means mutually orienting said stereo images with respect to said scanning axes providing a predetermined mutual phase relationship of said scanning spots on said images; two output signal responsive motor devices including means for driving one of said scanning axes relative to the image intersected thereby in one co-ordinate direction by one motor device and in another co-ordinate direction at right angles thereto by the other of said motor devices; an independent energy source for said motor devices including a 90 degree phase shift network therebetween effecting driving of said motor devices inversely responsive to said output signal and reversibly responsive to the phase of the latter; a vertical co-ordinate motor device including means driven thereby for simultaneously moving both said projection means toward and away from said images substantially in the direction of said scanning axes; and means energizing said vertical co-ordinate motor device including a low pass filter effectively removing alternating current components from said output signal and rendering said vertical co-ordinate responsive effectively to direct current components of said output signal.

9. The system claimed in claim 6 in which said scanning pathway is of annular form and in which each scanning spot traverses its image at a mean radial distance from said scanning axis and said point in the image travesed thereby; and means for simultaneously contracting the annular scanning pathway on each of said images to a predetermined minimum size responsive to said output signal to provide a scanning of said images at a minimum mean effective radius of traversing of said spots at maximum correlation and a predetermined maximum mean radius of scanning traversing by said spots at minimum correlation.

10. The system claimed in claim 7 in which said scanning pathway is of annular form and in which each scanning spot traverses its image at a mean radial distance from said scanning axis and said point in the image traversed thereby; and means for simultaneously contracting the annular scanning pathway on each of said images to a predetermined minimum size responsive to said output signal to provide a scanning of said images at a minimum mean effective radius of traversing of said spots at maximum correlation and a predetermined maximum mean radius of scanning traversing by said spots at minimum correlation.

11. The system claimed in claim 8 in which said scanning pathway is of annular form and in which each scanning spot traverses its image at a mean radial distance from said scanning axis and said point in the image traversed thereby; and means for simultaneously contracting the annular scanning pathway on each of said images to a predetermined minimum size responsive to said output signal to provide a scanning of said images at a minimum effective radius of traversing of said spots at maximum correlation and a predetermined maximum mean radius of scanning traversing by said spots at minimum correlation.

12. The system claimed in claim 6 in which said scanning pathway is of annular form and in which each scanning spot traverses its image at a mean radial distance from said scanning axis and said point in the image traversed thereby; and means for simultaneously contracting the annular scanning pathway on each of said images to a predetermined minimum size responsive to said output signal to provide a scanning of said images at a minimum mean effective radius of traversing of said spots at maximum correlation and a predetermined maximum mean radius of scanning traversing by said spots at minimum correlation, the scanning pathway of one of said images being of lesser effective mean radius by a constance difference as compared with the mean radius of the scanning pathway of the other image.

13. The system claimed in claim 6 in which said scanning pathway is of annular form and in which each scanning spot traverses its image at a mean radial distance from said scanning axis and said point in the image traversed thereby; means for simultaneously contracting the annular scanning pathway on each of said images to a predetermined minimum size responsive to said output signal to provide a scanning of said images at a minimum mean effective radius of traversing of said spots at maximum correlation and a predetermined maximum mean radius of scanning traversing by said spots at minimum correlation; and means for effecting an expansion and contraction of the size of each scanning spot responsive to said otuput signal simultaneous with the expansion and contraction of the scanning pathway of each image.

14. The method of correlating corresponding points in two stereo images each having similar information about said points therein and comprising: establishing a scanning spot; scanning one of the images with the scanning spot by moving said spot about said point therein; simultaneously and similarly scanning the other image in synchronism with the scanning of the said one of said images; generating first and second electrical scanning signals responsive respectively to the information scanned on said one and said other of said images; multiplying said signals to obtain a multiplied signal of maximum value at maximum correlation of information scanned on said images; and moving the scanning pattern relative to the other image responsive to said multiplied signal to obtain uniform correlation.

References Cited in the file of this patent

UNITED STATES PATENTS

| | | |
|---|---|---|
| 2,283,226 | Porter | May 19, 1942 |
| 2,679,636 | Hillyer | May 25, 1954 |
| 2,696,565 | Shockley | Dec. 7, 1954 |
| 2,703,150 | Rieber | Mar. 1, 1955 |
| 2,711,479 | Lewinter | June 21, 1955 |
| 2,787,188 | Berger | Apr. 2, 1957 |